US010427557B2

(12) United States Patent
Chen (10) Patent No.: US 10,427,557 B2
(45) Date of Patent: Oct. 1, 2019

(54) SEAT BASE AND A CHILD SAFETY SEAT (71) Applicant: Wonderland Switzerland AG, Steinhausen (CH)

(72) Inventor: Rui-Bin Chen, Taipei (TW)

(73) Assignee: WONDERLAND SWITZERLAND AG, Steinhausen (CH)

( * ) Notice: Subject to any disclaimer, the term of this patent is extended or adjusted under 35 U.S.C. 154(b) by 0 days.

(21) Appl. No.: 15/856,921

(22) Filed: Dec. 28, 2017

(65) Prior Publication Data
US 2018/0186254 A1    Jul. 5, 2018

(30) Foreign Application Priority Data
Jan. 3, 2017    (CN) .......................... 2017 2 0009250

(51) Int. Cl.
*B60N 2/26* (2006.01)
*B60N 2/28* (2006.01)
*B60N 2/90* (2018.01)

(52) U.S. Cl.
CPC ......... *B60N 2/2821* (2013.01); *B60N 2/2887* (2013.01); *B60N 2/919* (2018.02); *B60N 2/2845* (2013.01); *B60N 2002/967* (2018.02)

(58) Field of Classification Search
CPC .. B60N 2/2821; B60N 2/2845; B60N 2/2887; B60N 2/919; B60N 2002/967
USPC ........................................ 297/256.13, 256.16
See application file for complete search history.

(56) References Cited

U.S. PATENT DOCUMENTS

| | | | | |
|---|---|---|---|---|
| 4,681,368 A * | 7/1987 | Heath | ................. | B60N 2/2809 297/256.16 X |
| 5,052,750 A * | 10/1991 | Takahashi | ............ | B60N 2/2821 297/256.13 |
| 5,385,387 A * | 1/1995 | Kain | .................... | B60N 2/2806 297/256.16 X |
| 6,017,088 A * | 1/2000 | Stephens | ................ | A47D 13/02 297/256.16 X |
| 6,070,890 A * | 6/2000 | Haut | .................... | B60N 2/2821 297/256.16 X |
| 6,139,101 A * | 10/2000 | Berringer | ............ | B60N 2/2821 297/256.13 X |
| 6,454,350 B1 * | 9/2002 | Celestina-Krevh | ......................... | B60N 2/2821 297/256.13 X |
| 6,554,358 B2 * | 4/2003 | Kain | ................... | B60N 2/2806 297/256.13 |
| 6,705,676 B1 * | 3/2004 | Berringer | ............ | B60N 2/1839 297/256.16 X |
| 6,746,080 B2 * | 6/2004 | Tsugimatsu | .......... | B60N 2/2806 297/256.13 X |

(Continued)

*Primary Examiner* — Rodney B White
(74) *Attorney, Agent, or Firm* — Hamre, Schumann, Mueller & Larson, P.C.

(57) ABSTRACT

A seat base of a child safety seat is adapted to be rested on a vehicle seat. The child safety seat includes a seat shell removably mounted on the seat base. The seat shell has a bottom portion and a backrest portion. The seat base includes an upper facing wall, front and rear positioning members disposed to position the seat shell to the seat base, and an angle restraining structure raised from the upper facing wall and configured to restrain a largest recline angle of the backrest portion of the seat shell. A safety included angle of the seat shell is not more than 70 degrees, thereby ensuring prevention of over-reclining of the child safety seat.

10 Claims, 9 Drawing Sheets

(56) References Cited

U.S. PATENT DOCUMENTS

| | | | | |
|---|---|---|---|---|
| 6,857,700 B2* | 2/2005 | Eastman | B60N 2/2806 | 297/256.13 X |
| 7,059,677 B2* | 6/2006 | Balensiefer | B60N 2/2821 | 297/256.13 X |
| 7,472,955 B2* | 1/2009 | Crane | B60N 2/2806 | 297/256.13 X |
| 7,597,396 B2* | 10/2009 | Longenecker | B60N 2/2806 | 297/256.16 X |
| 8,186,757 B2* | 5/2012 | Duncan | B60N 2/2806 | 297/256.13 |
| 8,998,318 B2* | 4/2015 | Gaudreau, Jr. | B60N 2/2821 | 297/256.13 |
| 2002/0063450 A1* | 5/2002 | Washizuka | B60N 2/2806 | 297/256.16 X |
| 2006/0006714 A1* | 1/2006 | Van Geer | B60N 2/2806 | 297/256.16 |
| 2006/0273640 A1* | 12/2006 | Kassai | B60N 2/2806 | 297/256.16 |
| 2008/0067846 A1* | 3/2008 | Ohren | B60N 2/2821 | 297/256.16 |
| 2011/0298259 A1* | 12/2011 | Heisey | B60N 2/2821 | 297/256.16 |
| 2012/0013160 A1* | 1/2012 | Williams | B60N 2/2821 | 297/256.16 |
| 2012/0181822 A1* | 7/2012 | Williams | B60N 2/2806 | 297/256.16 X |
| 2012/0326474 A1* | 12/2012 | Williams | B60N 2/2821 | 297/256.16 X |
| 2013/0140864 A1* | 6/2013 | Fang | B60N 2/2863 | 297/256.16 |
| 2013/0200672 A1* | 8/2013 | Mo | B60N 2/2887 | 297/256.16 |
| 2014/0361589 A1* | 12/2014 | Hou | B60N 2/2824 | 297/256.16 |
| 2015/0048660 A1* | 2/2015 | Hou | B60N 2/90 | 297/256.16 |
| 2015/0048661 A1* | 2/2015 | Hou | B60N 2/90 | 297/256.16 |
| 2015/0108801 A1* | 4/2015 | Hou | B60N 2/2821 | 297/256.16 |
| 2017/0120782 A1* | 5/2017 | Denbo | B60N 2/2875 | |
| 2017/0190269 A1* | 7/2017 | Denbo | B60N 2/2884 | |

* cited by examiner

SEAT BASE AND A CHILD SAFETY SEAT

CROSS-REFERENCE TO RELATED APPLICATION

This application claims priority of Chinese Patent Application No. 201720009250.0, filed on Jan. 3, 2017.

FIELD

The disclosure relates to a child safety seat, and more particularly to a seat base of a child safety seat having an angle restraining structure to limit reclination of a seat shell of the child safety seat.

BACKGROUND

Figure 1:
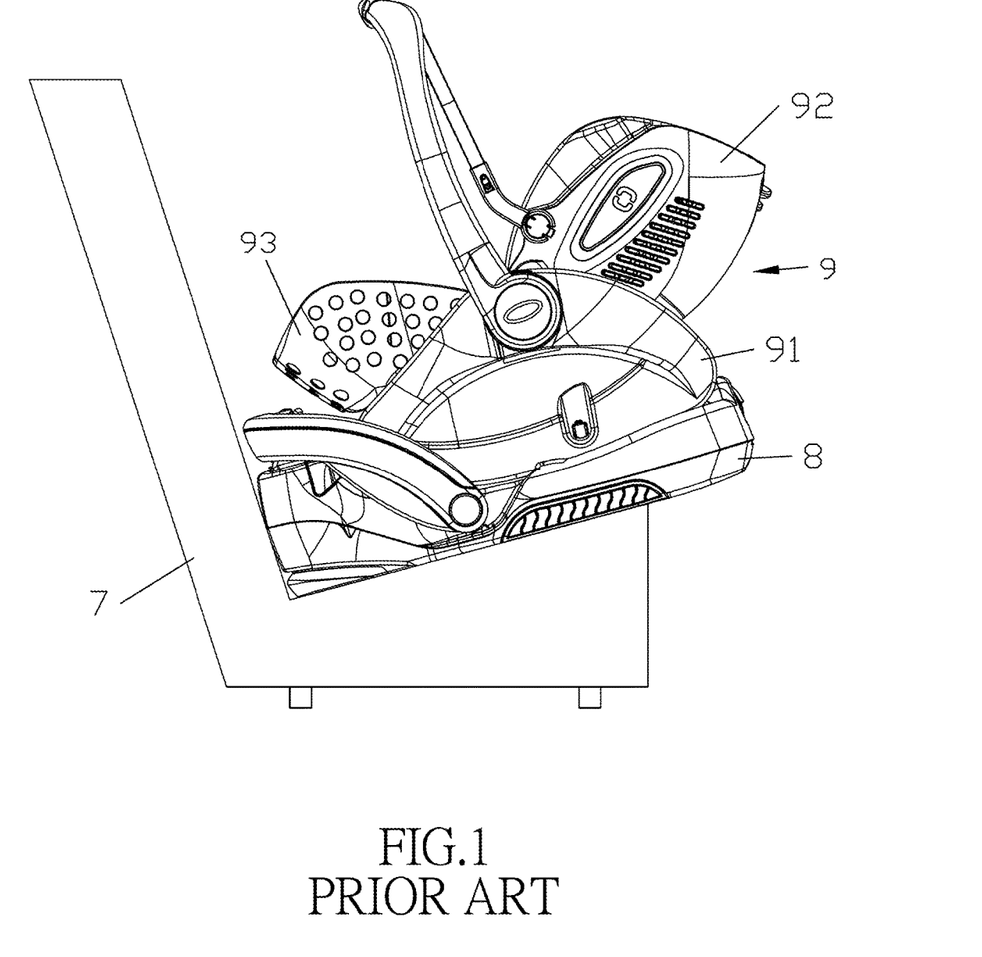
FIG. 1 is a schematic view illustrating a conventional child safety seat installed facing rearward on a vehicle seat.
Figure 2:
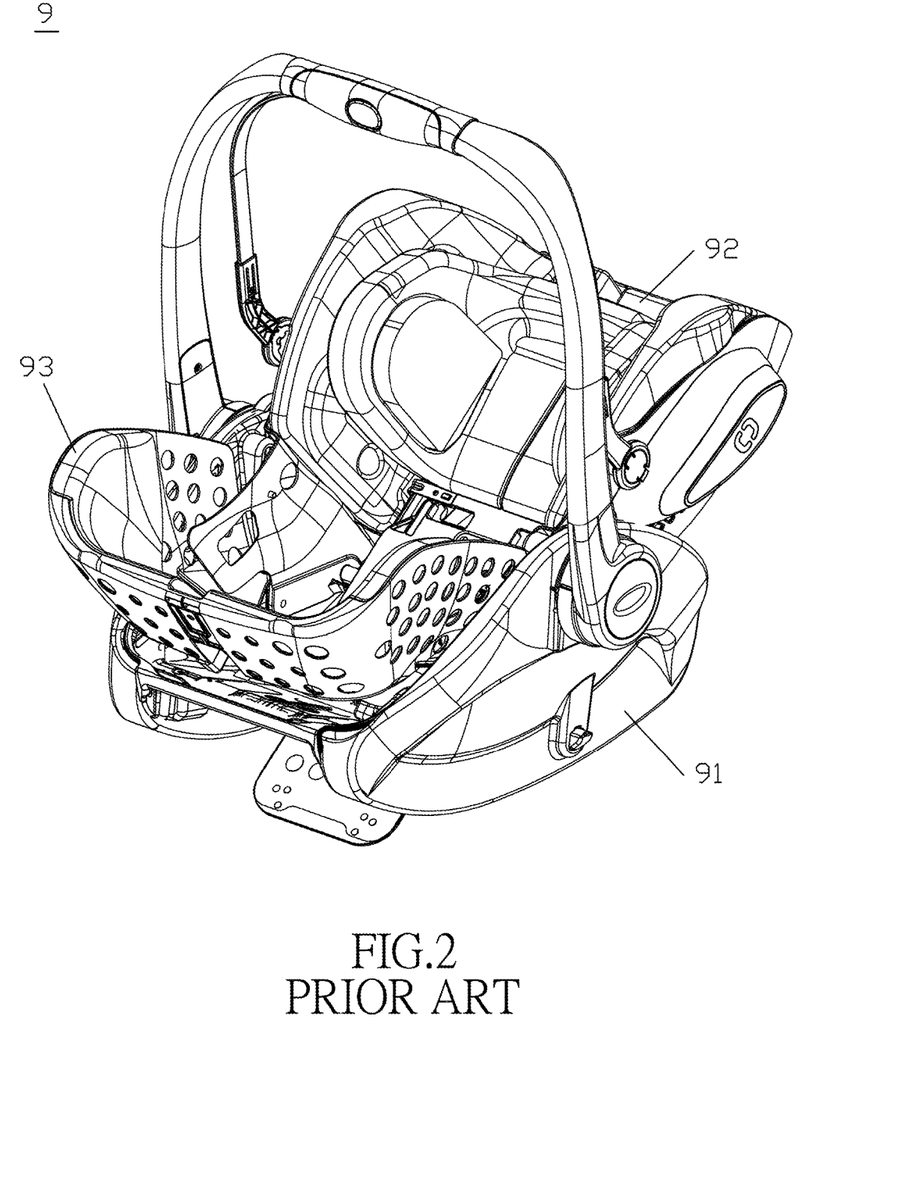
FIG. 2 is a perspective view of the conventional child safety seat.

Referring to FIG. 1, a conventional child safety seat includes a seat base 8 and a seat shell 9. The seat base 8 is installed on and secured to a vehicle seat 7 through an ISOFIX seat belt device. The seat shell 9 is mounted on the base seat 8 through a releasably latching mechanism so as to be removable from the seat base 8 to be alternatively installed on a stroller frame for facilitating carrying of a child. Referring to FIG. 2, the seat shell 9 includes a bottom portion 91 disposed to be connected with the seat base 8 or a stroller frame, a backrest portion 92 pivotably mounted to a rear end of the bottom portion 91, and a footrest portion 93 pivotably mounted to a front end of the bottom portion 91. Hence, the backrest portion 92 and the footrest portion 93 can be tilted relative to the bottom portion 91, so that the tilt angle of the backrest portion 92 and the footrest portion 93 can be adjusted appropriately for providing a satisfied feeling of comfort to a child.

Figure 3:
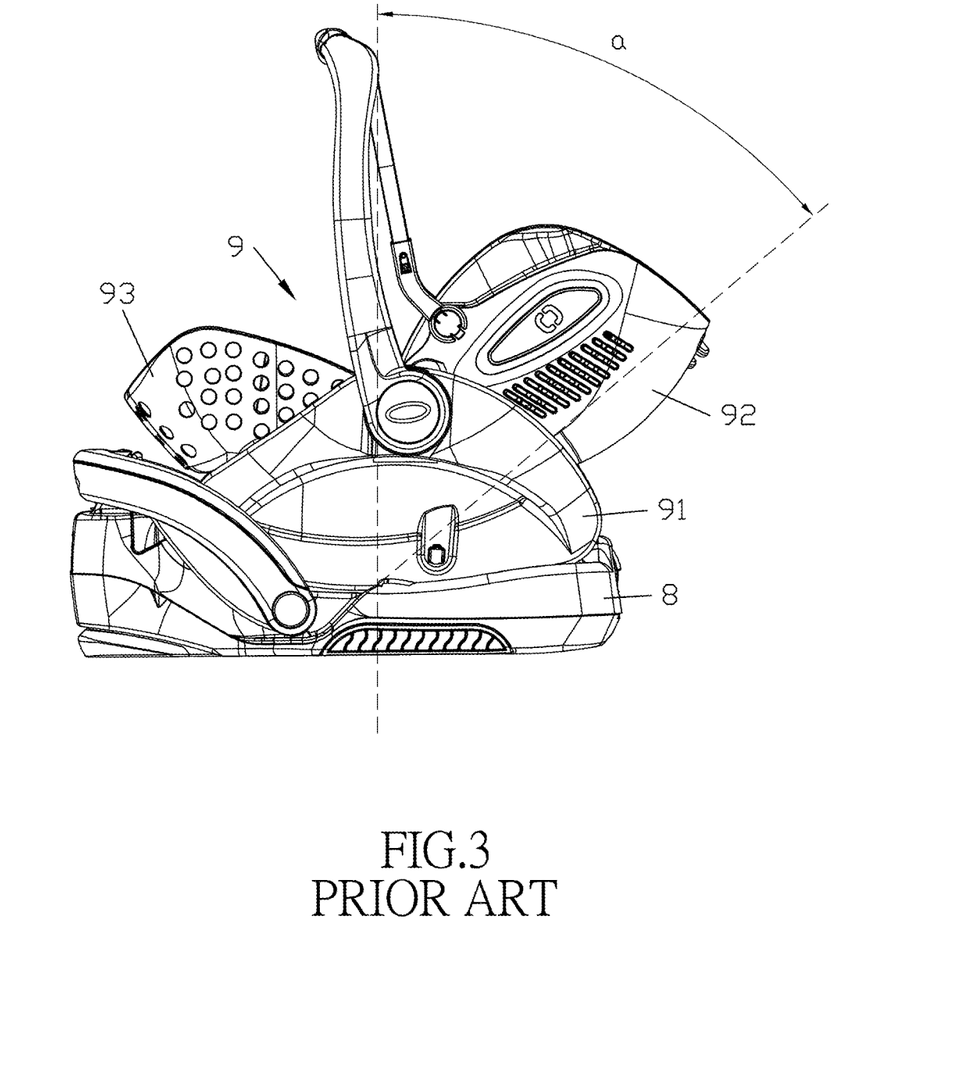
FIG. 3 is a side view of the conventional child safety seat.

Referring to FIG. 3, a safety angle (a), which is included by the backrest portion 92 and an upright direction, must not be more than 70 degrees as required by the safety rules of a crash test. However, since the seat base 8 generally has a horizontal rested surface for the seat shell 9 to rest thereon, the backrest portion 92 may be tilted to have the included angle be more than 70 degrees when a whole flat seating surface of the seat shell 9 is desired, and thus over-reclining of the safety seat might occur.

SUMMARY

Therefore, an object of the disclosure is to provide a seat base of a child safety seat that can prevent over-reclining of the child safety seat.

Another object of the disclosure is to provide a child safety seat having the seat base.

According to the disclosure, a seat base of a child safety seat is adapted to be rested on a vehicle seat. The child safety seat includes a seat shell which is removably mounted on the seat base. The seat shell has a bottom portion and a backrest portion which is pivotably mounted to a rear end of the bottom portion to be tilted relative to the bottom portion. The seat shell has a seating surface which is defined in part by a front facing side of the backrest portion and in part by a top facing side of the bottom portion. The seat base includes an upper facing wall which is disposed opposite to the vehicle seat in an upright direction and substantially parallel to the vehicle seat, front and rear positioning members which are spaced apart from each other in a font-and-rear direction, and which are disposed to position the seat shell to the seat base, and an angle restraining structure which is raised from the upper facing wall and which is configured to restrain a recline angle of the backrest portion of the seat shell.

According to the disclosure, a child safety seat includes a seat shell and the above-mentioned seat base.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 4A:
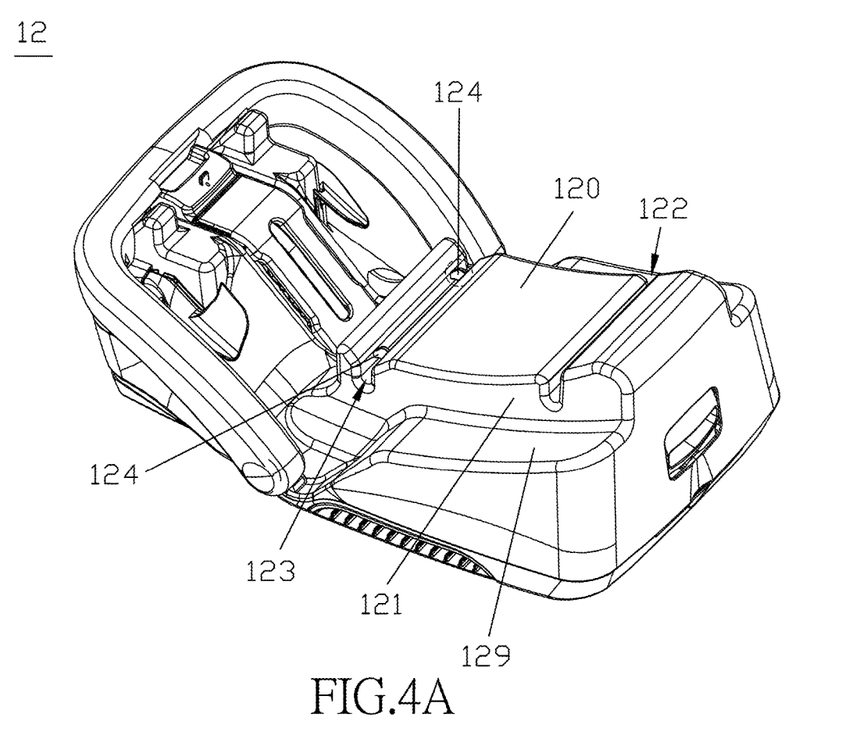
FIG. 4A is a perspective view illustrating a first embodiment of a seat base of a child safety seat according to the disclosure.
Figure 4B:
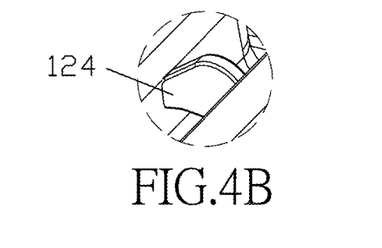
FIG. 4B is an enlarged view of an encircled portion in FIG. 4A.
Figure 5:
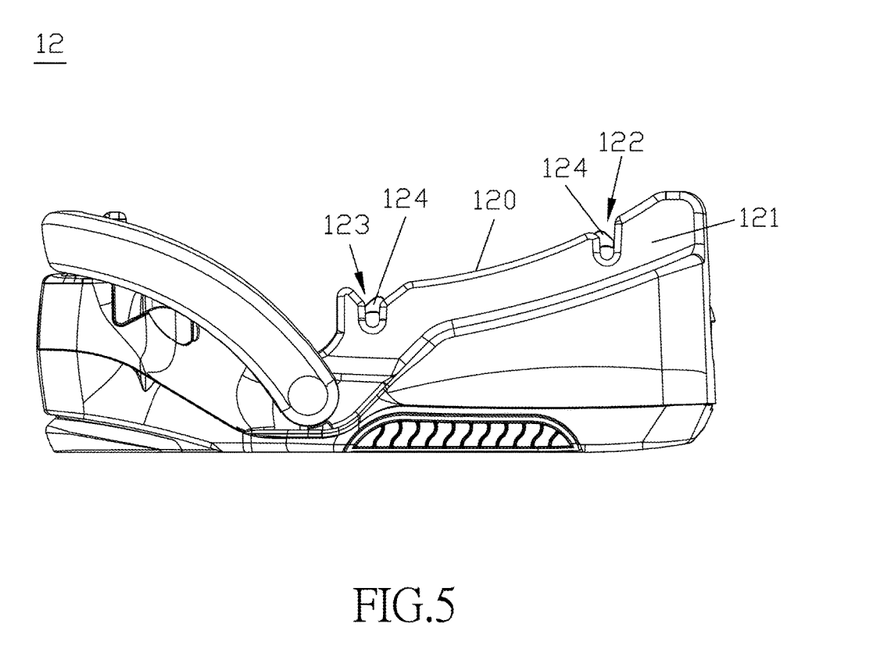
FIG. 5 is a side view of the first embodiment of the seat base.
Figure 6A:
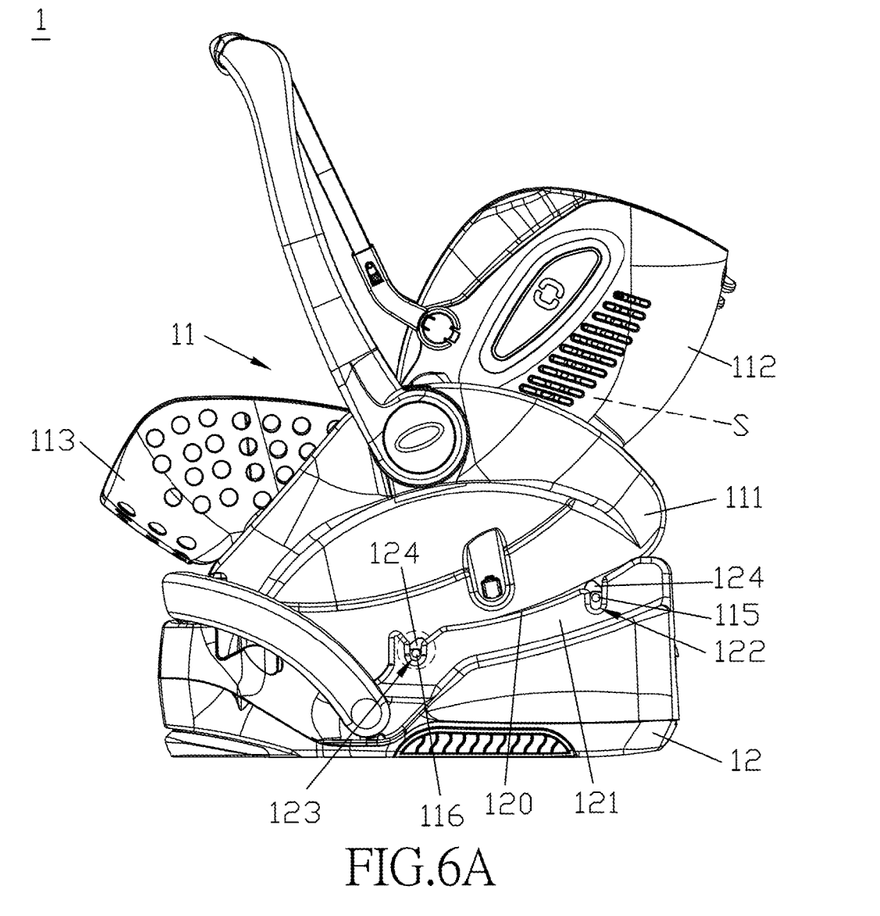
FIG. 6A is a side view illustrating the first embodiment of the seat base fastened to a seat shell of the child safety seat, and FIG. GB is an enlarged view of an encircled portion in FIG. 6A.
Figure 6B:
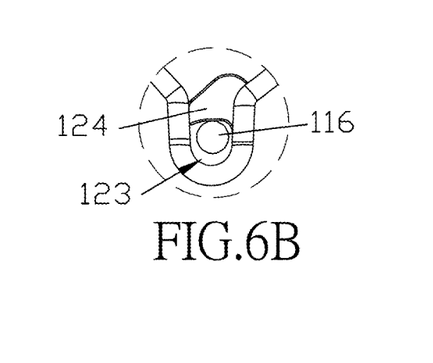

Referring to FIGS. 4 to 6, a first embodiment is illustrated and provides a child safety seat 1. The child safety seat 1 is adapted to be rested on a vehicle seat (not shown), and includes a seat shell 11 and a seat base 12. The seat shell 11 is removably mounted on the seat base 12. The seat shell 11 includes a bottom portion 111, and a backrest portion 112 and a footrest portion 113 which are pivotably mounted to rear and front ends of the bottom portion 111, respectively, to be tilted relative to the bottom portion 111. The seat shell 11 has a seating surface (S) which is defined in part by a front facing side of the backrest portion 112 and in part by a top facing side of the bottom portion 111. The seat base 12 has an upper facing wall 129 which is disposed opposite to the vehicle seat in an upright direction and at a rear end of the seat base 12, and which extends substantially parallel to the vehicle seat, and an angle restraining structure which is raised from the upper facing wall 129 and which is configured to raise the rear end of the bottom portion 111 of the seat shell 11 relative to the front end of the bottom portion 111 so as to place the seating surface (S) of the seat shell 11 at the backrest portion 112 higher than the seating surface (S) at the bottom portion 111. Before mounted on the seat base 12, the backrest portion 112 is adjusted to tilt relative to the bottom portion 111 to a desired angular position, such as an upright position, a lying position and a middle position. The upright position is where a distal end of the backrest portion 112 is in a highest and nearly erect position, and the lying position is where the distal end of the backrest portion 112 is in a lowest and nearly horizontal position.

Referring to FIGS. 4 and 5, in this embodiment, the angle restraining structure has an inclined wall 121 which is integrally formed with the upper facing wall 129 and which has an inclined wall surface 120 that is inclined downwardly from a rear end to a front end thereof for the rear end of the bottom portion 111 of the seat shell 11 to be rested thereon. The seat base 12 has front and rear positioning members 123, 122 which are spaced apart from each other in a font-and-rear direction and which are disposed to position the seat shell 11 to the seat base 12 and to keep the seat shell 11 spaced apart from the upper facing wall 129. Specifically, the front and rear positioning members 123, 122 are disposed adjacent to the front and rear ends of the inclined wall 121, respectively. Each of the front and rear positioning members 123, 122 is in the form of a positioning groove which is concaved in the inclined wall surface 120. The seat base 12 further includes releasable latches 124 each of which is disposed in the positioning groove to hold the bottom portion 111 of the seat shell 11 to the seat base 12. The latch 124 in the front positioning groove 123 has a forwardly-opened hook end, and the latch 124 in the rear positioning groove 122 has a rearwardly-opened hook end.

With reference to FIGS. 6A and 6B, the bottom portion 111 of the seat shell 11 has front and rear positioned members 116, 115 which are disposed to be matingly engaged with the front and rear positioning members 123, 122, respectively. Specifically, each of the front and rear positioned members 116, 115 is in the form of a positioned crosspiece which is configured to be fittingly engaged in the respective positioning groove 123, 122 and which is releasably fastened in the respective positioning groove 123, 122 by means of a latch mechanism. The latch mechanism includes the above-described latches 124. With the latches 124 anchoring the positioned crosspieces 116, 115, the seat shell 11 is fastened to the seat base 12 to have the rear end of the bottom portion 111 rested on the inclined wall surface 120 of the inclined wall 121. Alternatively, the grooves and the crosspieces may be disposed on the seat shell 11 and the seat base 12, respectively. The number of the grooves and the crosspieces may be varied as required.

Referring again to FIGS. 6A and 6B, the rear end of the bottom portion 111 of the seat shell 11 is raised by the inclined wall 121 to be slightly and forwardly inclined when the seat shell 11 is mounted on the seat base 12. The largest recline angle of the backrest portion 112 of the seat shell 11 is restrained. That is, the safety included angle between the backrest portion 112 and the upright direction is reduced. The backrest portion 112 can still be adjusted among the upright position, the lying position and the middle position. With the inclined wall 121 which can be configured to have an appropriate height and inclination, the safety included angle of less than 70 degrees can be made even when the backrest portion 112 is adjusted to the lying position.

Figure 7A:
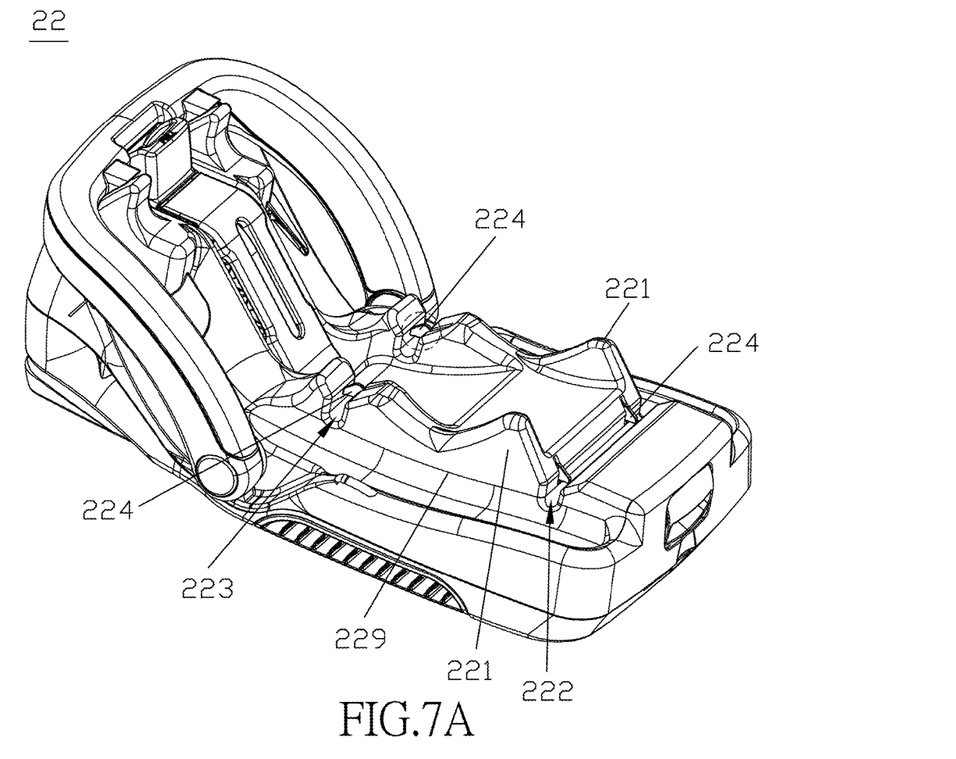
FIG. 7A is a perspective view illustrating a second embodiment of a seat base of a child safety seat according to the disclosure.
Figure 7B:
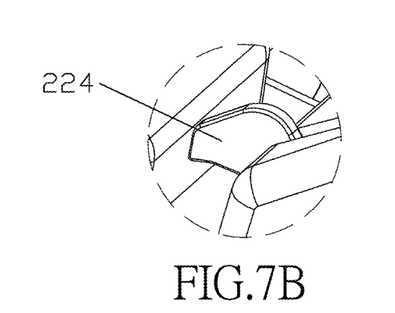
FIG. 7B is an enlarged view of an encircled portion in FIG. 7A.
Figure 8:
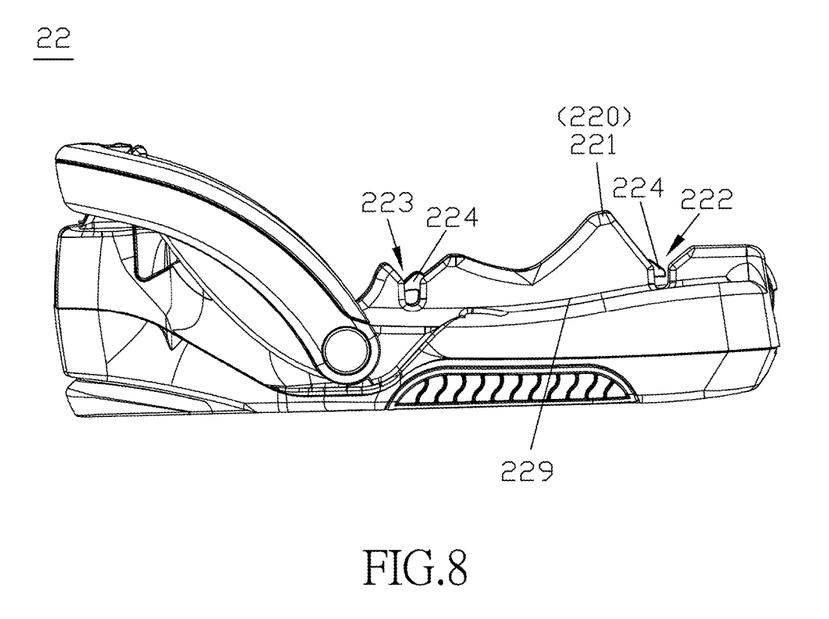
FIG. 8 is a side view of the second embodiment of the seat base.
Figure 9:
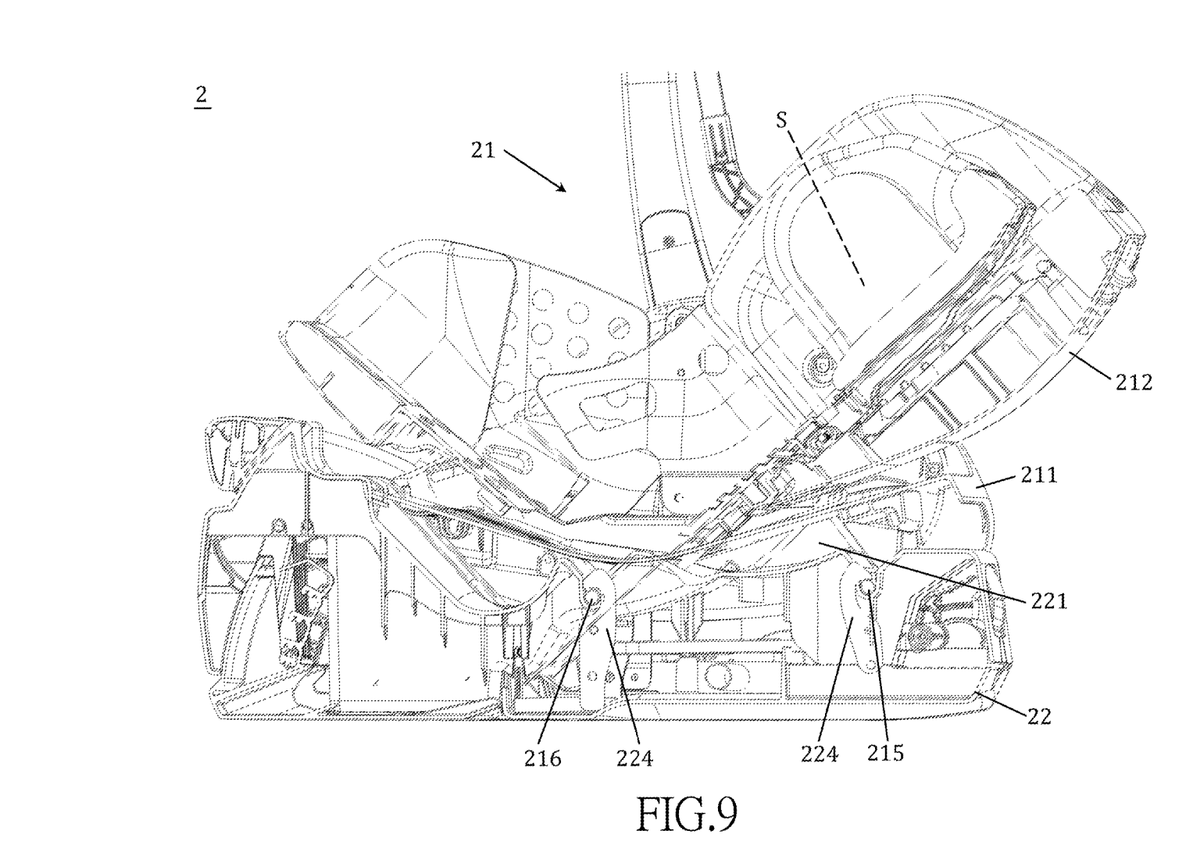
FIG. 9 is a schematic, partly sectional view illustrating the second embodiment of the seat base fastened to a seat shell of the child safety seat.

Referring to FIGS. 7 to 9, a second embodiment of a child safety seat 2 is illustrated. In this embodiment, the angle restraining structure is configured to raise the backrest portion 212 relative to the front end of the bottom portion 211 so as to place the seating surface (S) of the seat shell 21 at the backrest portion 212 higher than that at the bottom portion 211. The angle restraining structure is configured to be inserted between the backrest portion 212 and the bottom portion 211 when the seat shell 21 is mounted on the seat base 22.

Referring to FIGS. 7 and 8, the angle restraining structure has at least one rib 221 which is formed on and extends upwardly from the upper facing wall 229.

Specifically, two ribs 221 are spaced apart from each other, and are substantially triangular in shape. The ribs 221 may be integrally formed with the upper facing wall 229. Each of the ribs 221 is disposed between the front and rear positioning members 223, 222 in the form of positioning grooves.

With reference to FIG. 9, the bottom portion 211 has openings (not shown). The ribs 221 have tip portions 220 which extend through the openings and toward the backrest portion 212. With restraint of the ribs 221, the backrest portion 212 is kept away from attachment to the bottom portion 211 so as not to be adjusted to the lying position (i.e., the lowest position). Thus, the safety included angle between the backrest portion 212 and the upright direction is not more than 70 degrees.

As illustrated, with the angle restraining structure disposed on the seat base 12, 22, a safety included angle of the seat shell 11, 21 is ensured not to be more than 70 degrees for preventing over-reclining of the child safety seat 1, 2 to meet the regulatory requirement of the crash test. Moreover, the seat shell 12, 22, when intended to be installed on a stroller frame, is not required to be changed in structure, thereby still permitting adjustment of the backrest portion 112, 212 relative to the bottom portion 111, 211 among the upright position, the lying position and the middle position after installment.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A seat base of a child safety seat adapted to be rested on a vehicle seat, the child safety seat including a seat shell which is removably mounted on said seat base, the seat shell having a bottom portion and a backrest portion which is pivotably mounted to a rear end of the bottom portion to be tilted relative to the bottom portion, the seat shell having a seating surface which is defined in part by a front facing side of the backrest portion and in part by a top facing side of the bottom portion, said seat base comprising:

an upper facing wall which is disposed opposite to the vehicle seat in an upright direction and substantially parallel to the vehicle seat;

front and rear positioning members which are spaced apart from each other in a font-and-rear direction and which are disposed to position the seat shell to said seat base; and an angle restraining structure which is raised from said upper facing wall and which is configured to restrain a recline angle of the backrest portion of the seat shell, wherein said angle restraining structure is configured to raise one of the rear end of the bottom portion of the seat shell and the backrest portion relative to a front end of the bottom portion so as to place the seating surface of the seat shell at the backrest portion higher than the seating surface at the bottom portion, and wherein said angle restraining structure has a tip portion which projects from said upper facing wall and which is configured to extend through the bottom portion of the seat shell and to extend toward the backrest portion.

2. The seat base as claimed in claim 1, wherein said angle restraining structure has an inclined wall which is disposed on said upper facing wall and which has an inclined wall surface that is inclined downwardly from a rear end to a front end thereof for the rear end of the bottom portion to be rested thereon.

3. The seat base as claimed in claim 2, wherein said front and rear positioning members are disposed on said inclined wall.

4. The seat base as claimed in claim 1, wherein said angle restraining structure has at least one rib which is formed on said upper facing wall and which extends upwardly to terminate at said tip portion.

5. The seat base as claimed in claim 4, wherein said rib is disposed between said front and rear positioning members.

6. The seat base as claimed in claim 4, wherein said angle restraining structure has two of said ribs which are spaced apart from each other.

7. A seat base of a child safety seat adapted to be rested on a vehicle seat, the child safety seat including a seat shell which is removably mounted on said seat base, the seat shell having a bottom portion and a backrest portion which is pivotably mounted to a rear end of the bottom portion to be tilted relative to the bottom portion, the seat shell having a seating surface which is defined in part by a front facing side of the backrest portion and in part by a top facing side of the bottom portion, said seat base comprising:
an upper facing wall which is disposed opposite to the vehicle seat in an upright direction and substantially parallel to the vehicle seat
front and rear positioning members which are spaced apart from each other in a font-and-rear direction and which are disposed to position the seat shell to said seat base;
an angle restraining structure which is raised from said upper facing wall and which is configured to restrain a recline angle of the backrest portion of the seat shell; and
releasable latches each disposed in said positioning groove to hold the bottom portion of the seat shell to said seat base,
wherein each of said front and rear positioning members is in the form of a positioning groove.

8. A child safety seat comprising:
a seat base of a child safety seat adapted to be rested on a vehicle seat, the child safety seat including a seat shell which is removably mounted on said seat base, the seat shell having a bottom portion and a backrest portion which is pivotably mounted to a rear end of the bottom portion to be tilted relative to the bottom portion, the seat shell having a seating surface which is defined in part by a front facing side of the backrest portion and in part by a top facing side of the bottom portion, said seat base comprising:
an upper facing wall which is disposed opposite to the vehicle seat in an upright direction and substantially parallel to the vehicle seat
front and rear positioning members which are spaced apart from each other in a font-and-rear direction and which are disposed to position the seat shell to said seat base; and
an angle restraining structure which is raised from said upper facing wall and which is configured to restrain a recline angle of the backrest portion of the seat shell,
wherein said bottom portion of said seat shell has front and rear positioned members which are disposed to be matingly engaged with said front and rear positioning members, respectively.

9. The child safety seat as claimed in claim 8, wherein each of said front and rear positioning members is in the form of a positioning groove, and each of said front and rear positioned members is in the form of a positioned crosspiece which is configured to be fittingly engaged in said positioning groove.

10. The child safety seat as claimed in claim 9, wherein said seat base has a latch mechanism which is disposed to releasably fasten said positioned crosspiece in said positioning groove.

* * * * *